April 18, 1950        A. KRAAK        2,504,424
LIQUID SHOCK ABSORBER
Filed Aug. 30, 1948
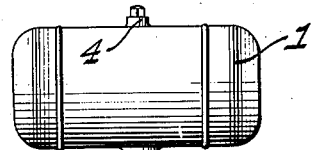
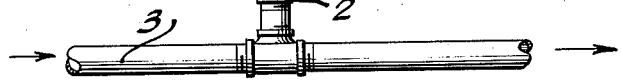
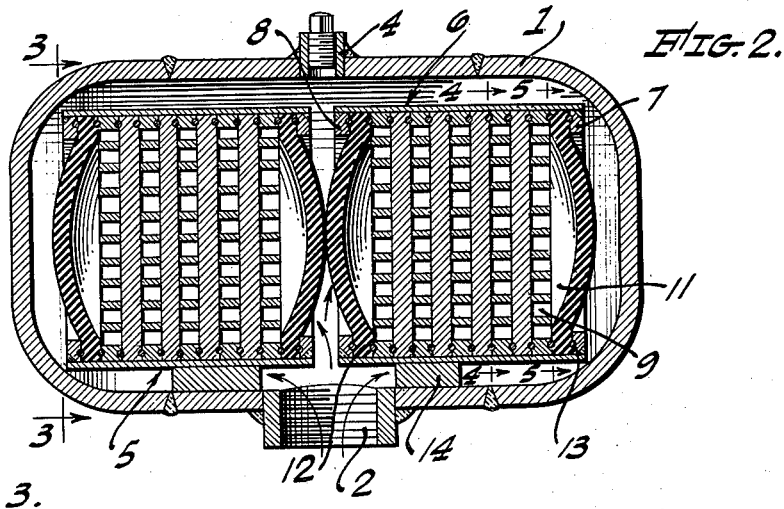
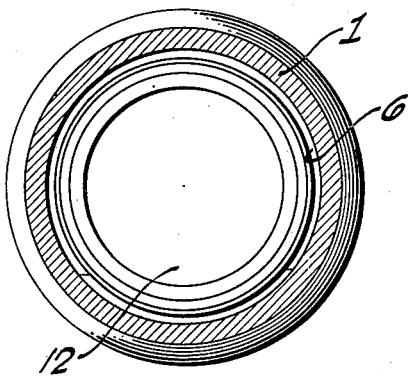
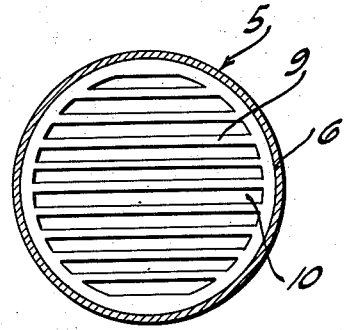
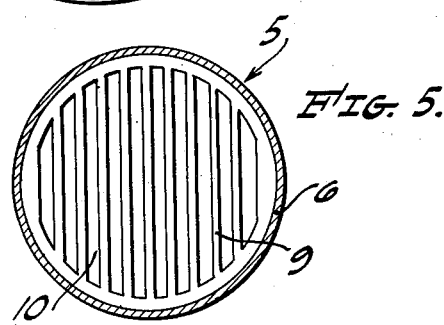
INVENTOR.
ABRAHAM KRAAK,
BY
ATTORNEY.

Patented Apr. 18, 1950

2,504,424

UNITED STATES PATENT OFFICE 2,504,424

LIQUID SHOCK ABSORBER

Abraham Kraak, Long Beach, Calif.

Application August 30, 1948, Serial No. 46,871

5 Claims. (Cl. 138—30)

This invention relates to a liquid shock absorber, or accumulator, of the type connected to a high pressure hydraulic system, and the purpose of the device is to eliminate excessive shocks to the pipe lines caused by surge interruptions in the flow of fluid, and for other causes.

An object of my invention is to provide a novel liquid shock absorber in which surge or shock in the hydraulic lines is absorbed by compression of a plurality of rubber or plastic discs.

Another object of my invention is to provide a device of the character stated in which the super-imposed rubber or plastic discs are so constructed that a considerable compression is permitted by external pressure.

Another object of my invention is to provide a novel device of the character stated, in which the compressible discs are assembled in packs or units, each pack or unit being sealed to prevent the movement of fluid into the pack or unit from the outside.

Still another object is to provide a liquid shock absorber which is simple in construction, inexpensive to manufacture, and effective in use.

Other objects, advantages and features of invention may appear from the accompanying drawing, the subjoined detailed description and the appended claims.

In the drawing—

Figure 1 is a side elevation of my liquid shock absorber mounted in a hydraulic line.

Figure 2 is a longitudinal, sectional view of the shock absorber.

Figure 3 is a sectional view taken on line 3—3 of Figure 2.

Figure 4 is a sectional view taken on line 4—4 of Figure 2.

Figure 5 is a sectional view taken on line 5—5 of Figure 2.

Referring more particularly to the drawing, the numeral 1 indicates a housing of sufficient size and strength for the particular pressures encountered in the system in which the device is to be used. The housing 1 includes an intake nipple 2 on the bottom, which is connected to the hydraulic line 3 in the usual and well known manner. An opening 4 in the top of the housing 1 may be plugged if desired, or it may be used as a bleed port, or may accommodate a pressure gauge if desired.

Within the housing 1, I provide one or more shock units 5, which consist of an outer tube 6 formed of suitable metal, and of a size to fit within the housing 1. The tube 6 is of smaller diameter than the inside of the housing 1, substantially as shown. Retaining rings 7 and 8 are fixedly mounted, one at each end of the tube 6, and these rings are preferably welded onto the inside of the tube. A plurality of super-imposed discs 9 are mounted within the tube 6, and closely fit the inner diameter of the tube. Each of these discs is provided with elongated slots or openings 10 extending therethrough, the purpose of these slots being to make the discs resilient so that they will more readily compress under pressure. Solid rubber or plastic discs 11, 12 are mounted one at each end of the pack of discs 9, and these last named discs being solid will prevent the infiltration of liquid into the pack of discs. A packing ring 13 is arranged between each of the discs 9, 11, and 12, the purpose of these packing rings being to prevent the movement of liquid under pressure around the outer edges of the discs.

Thus, it will be evident that the disc pack is so constructed that all liquid is excluded from the inside of the pack, and still the pack can compress and expand under pressure, and release of pressure, due to the natural resilience of the rubber or plastic from which the discs are made. The units 5 are fixedly mounted within the housing 1 by suitable means, such as the blocks 14, or the like. In assembling the discs 9, I prefer to arrange them so that the slots 10 therein are arranged at an angle in adjacent discs. This provides for greater resiliency in the discs.

Having described by invention, I claim:

1. A liquid shock absorber comprising a housing, having an intake port therein, a shock absorbing pack unit means mounting said pack unit in said housing, said pack unit including a plurality of super-imposed resilient discs, and means fixedly holding said discs in position.

2. A liquid shock absorber comprising a housing, having an intake port therein, a shock absorbing pack unit means mounting said pack unit in said housing, said pack unit including a plurality of super-imposed resilient discs, a tube in which said discs are mounted, and sealing means preventing movement of liquid between the tube and the discs.

3. A liquid shock absorber comprising a housing, having an intake port therein, a shock absorbing pack unit, said housing comprising a tube, means mounting said tube in the housing, a plurality of super-imposed discs mounted within said tube, each of said discs having slots formed therein, and a solid disc at each end of said tube, each of the solid discs bearing against the adjacent slotted disc.

4. A liquid shock absorber comprising a housing, having an intake port therein, a shock absorbing pack unit, said housing comprising a tube, means mounting said tube in the housing, a plurality of super-imposed discs mounted within said tube, each of said discs having slots formed therein, and a solid disc at each end of said tube, each of the solid discs bearing against the adjacent slotted disc, and an annular packing ring between each of said discs, said rings being positioned adjacent the peripheries of the discs.

5. A liquid shock absorber comprising a housing, having an intake port therein, a shock absorbing pack unit, said housing comprising a tube, means mounting said tube in the housing, a plurality of super-imposed discs mounted within said tube, each of said discs having slots formed therein, and a solid disc at each end of said tube, each of the solid discs bearing against the adjacent slotted disc, and an annular packing ring between each of said discs, said rings being positioned adjacent the peripheries of the discs, and a retaining ring fixedly mounted at each end of said tube, said retaining rings bearing against said solid discs.

ABRAHAM KRAAK.

REFERENCES CITED

The following references are of record in the file of this patent:

UNITED STATES PATENTS

| Number | Name | Date |
|---|---|---|
| 312,882 | Mentel | Feb. 24, 1885 |
| 1,809,927 | Emanueli | June 16, 1931 |